3,331,861
3- AND 4-CARBAMOYLOXY TETRAHYDROFURANS

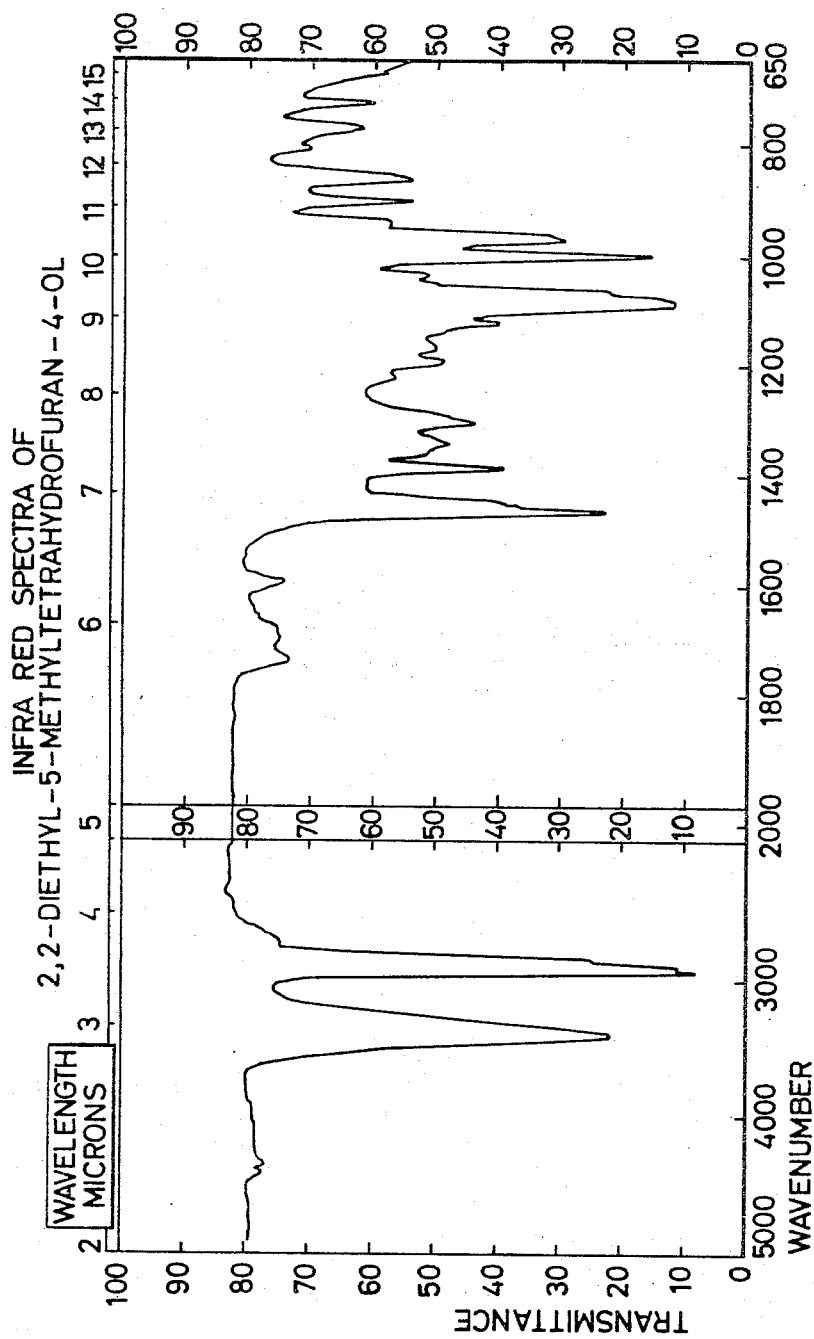

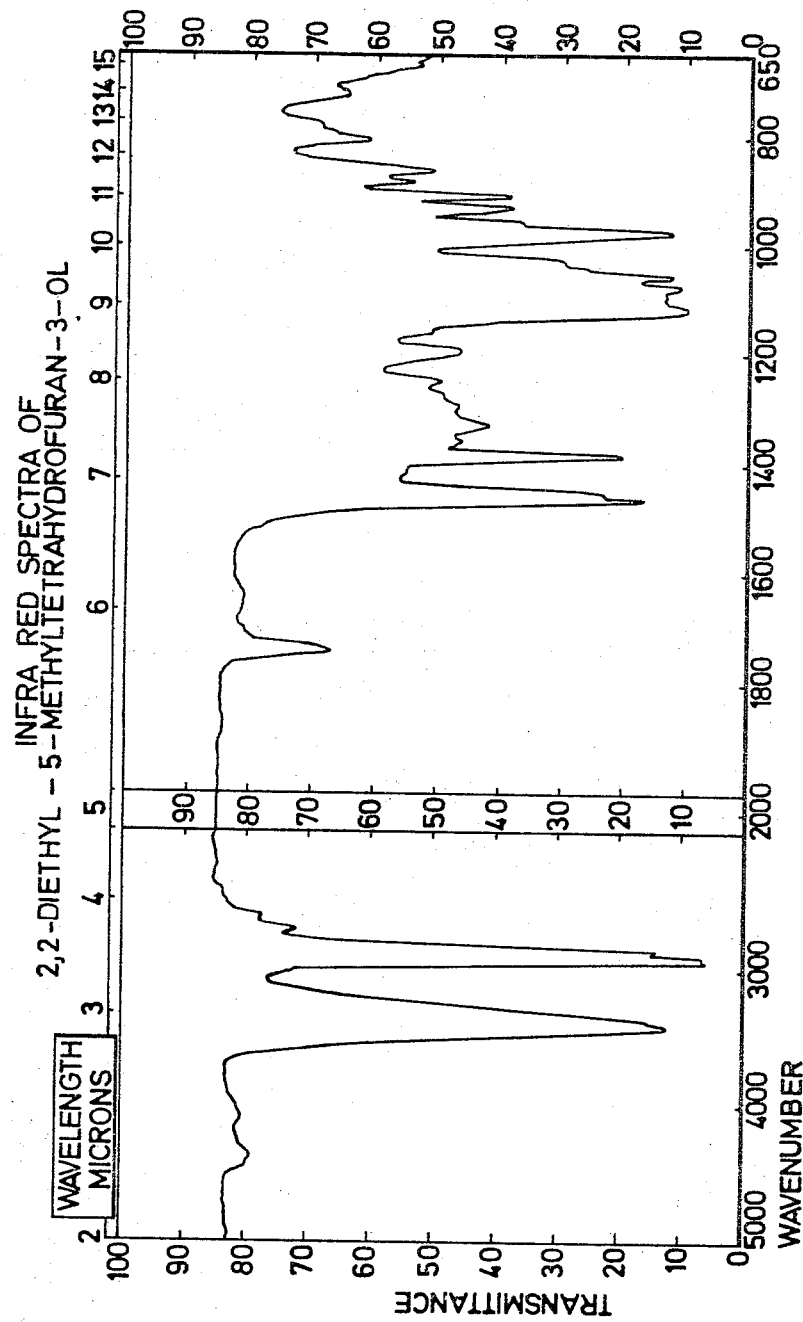

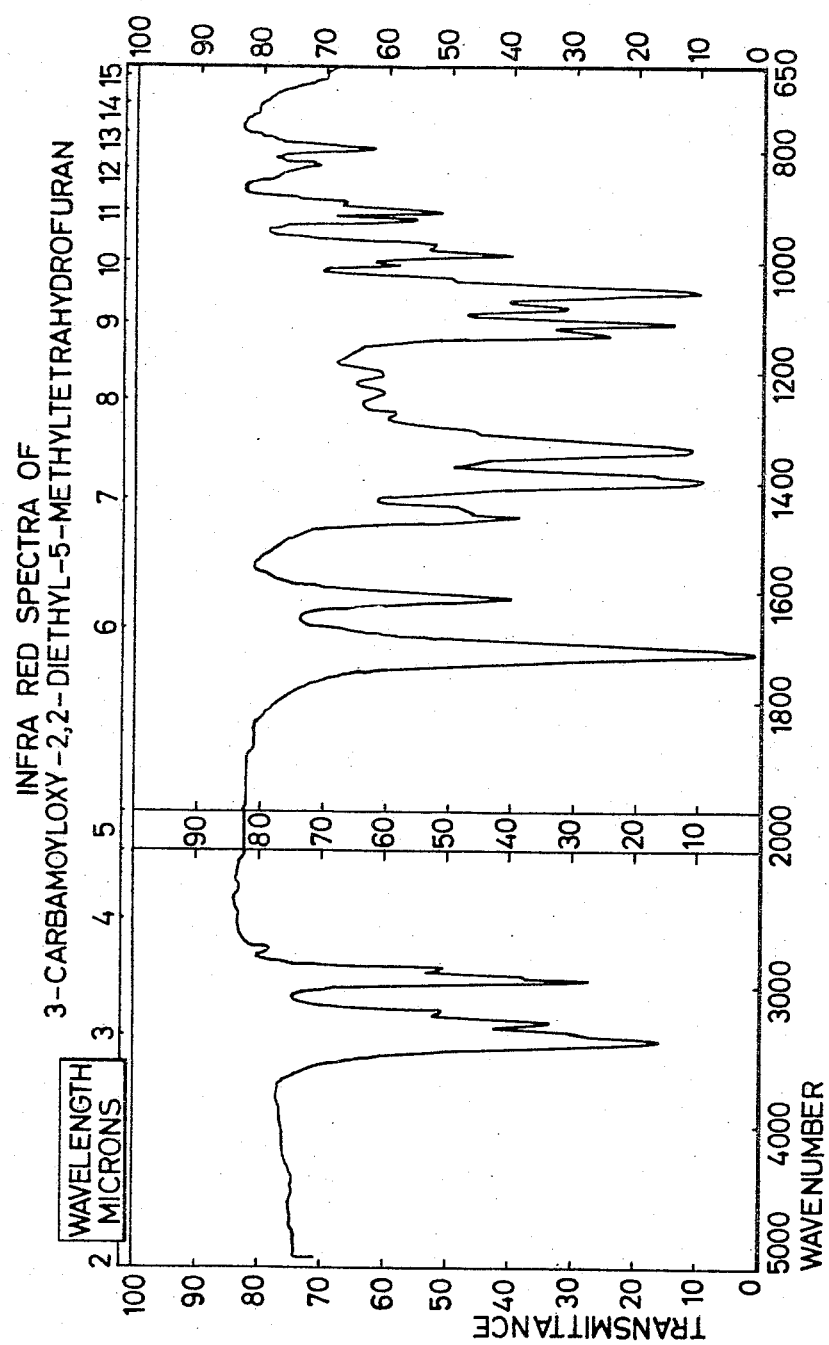

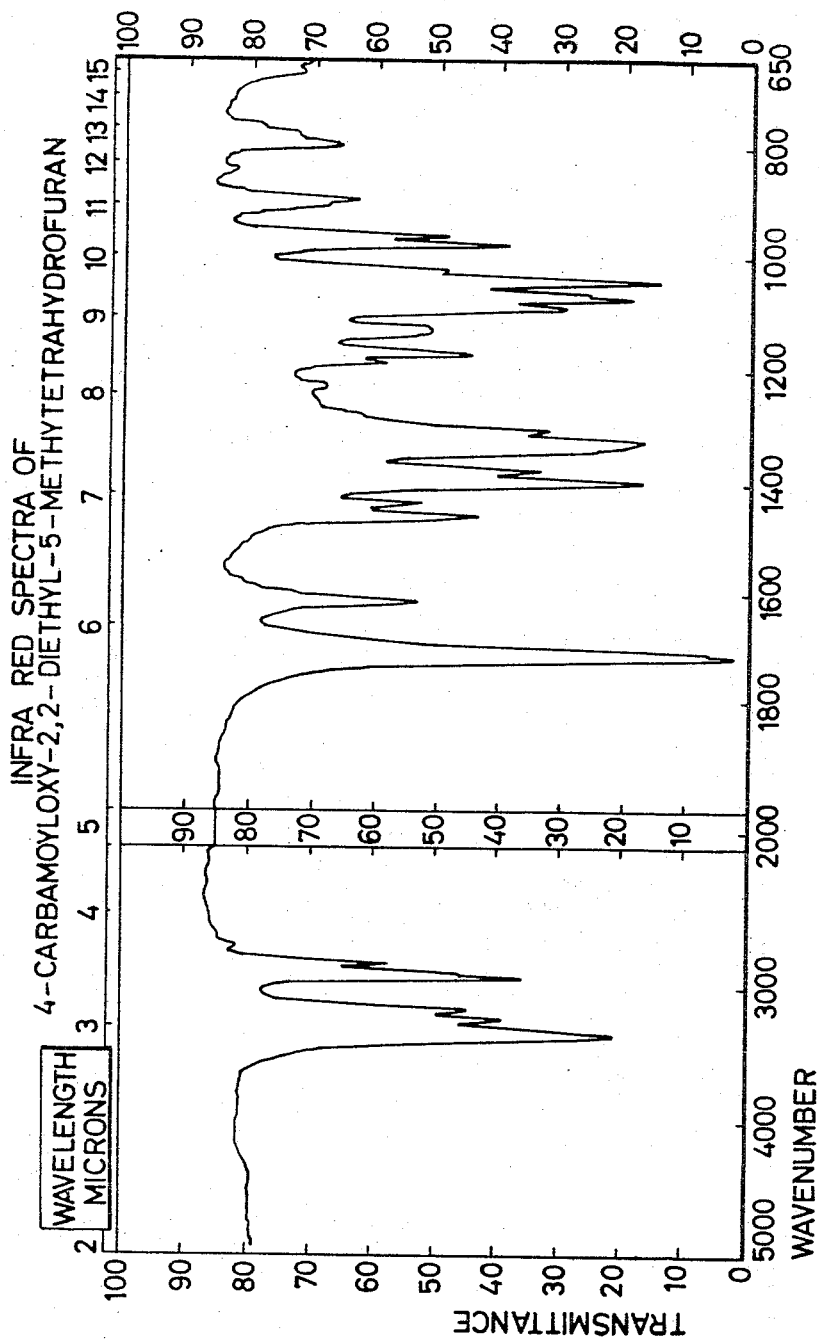

Heather Nina Yeowell, Dobbs Ferry, N.Y., and Glyn Evan Lee, Brentwood, George Brian Leslie, Romford, Derek William Pulsford, Corringham, William Robert Wragg, Woodford Green, and Donald Robert Maxwell, Shenfield, England, assignors to May & Baker Limited, Dagenham, Essex, England, a British company
Filed July 14, 1965, Ser. No. 471,901
Claims priority, application Great Britain, Dec. 31, 1964, 53,065/64; July 17, 1964, 29,308/64
3 Claims. (Cl. 260—347.4)

This invention relates to new tetrahydrofuranol derivatives, to processes for their preparation and to pharmaceutical compositions containing them.

According to the prevent invention, there are provided the new tetrahydrofuranol derivatives of the general formula:

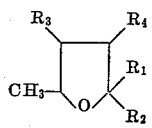

I wherein $R_1$ represents a methyl or ethyl group and $R_2$ represents an ethyl or propyl group, $R_1$ being ethyl when $R_2$ is ethyl, and one of $R_3$ and $R_4$ represents a hydrogen atom and the other represents a hydroxy, carbamoyloxy or N-monomethylcarbamoyloxy group.

These tetrahydrofuranol derivatives possess valuable pharmacodynamic properties, being particularly useful as oral hypnotics. Preferred compounds of outstanding value as oral hypnotics are 2,2-diethyl-5-methyl-tetrahydrofuran - 3 - ol, 2,2 - diethyl - 5 - methyl - tetrahydrofuran-4-ol and, more especially, 3-carbamoyloxy-2,2-diethyl-5-methyl-tetrahydrofuran and 4-carbamoyloxy-2,2-diethyl-5-methyl-tetrahydrofuran.

According to a feature of the present invention, the compounds of general Formula I wherein one of $R_3$ and $R_4$ represents a hydrogen atom and the other represents a hydroxy group are prepared by the reduction, by methods known per se for the reduction of ketones to secondary alcohols, of the ketone group of a compound of the general formula:

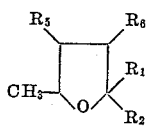

II (wherein $R_1$ and $R_2$ are as hereinbefore defined, and one of $R_5$ and $R_6$ represents a hydrogen atom and the other represents an oxygen atom forming a ketone group with the carbon atom of the heterocyclic ring to which it is attached), for example by treatment with sodium and an alcohol e.g., ethanol, with lithium aluminum hydride in an inert organic medium such as an ether, e.g. diethyl ether or tetrahydrofuran, or with sodium or potassium borohydride in a suitable organic or aqueous organic medium, e.g. aqueous methanol, or by catalytic hydrogenation. Hydrogenation may be carried out in an inert organic medium such as a lower alkanol, e.g. ethanol, in the presence of Raney nickel catalyst at elevated temperature and pressure.

The ketones of general Formula II may be prepared by the cyclisation of compounds of the formula:

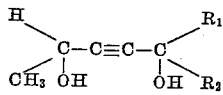

III (wherein $R_1$ and $R_2$ are as hereinbefore defined) by treatment with mercuric sulphate or mercuric acetate in the presence of sulphuric acid in an aqueous medium, or with boron trifluoride in a lower alkyl ether, e.g. diethyl ether, in the presence of red mercuric oxide and trichloracetic acid in a lower alkanol, e.g. methanol or ethanol.

Cyclisation of a compound of Formula III produces a mixture of two isomeric compounds of Formula II, one in which $R_5$ represents a hydrogen atom and $R_6$ represents an oxygen atom, and another in which $R_5$ represents an oxygen atom and $R_6$ represents a hydrogen atom. Thus, when 2,5-dihydroxy-5-ethyl-hept-3-yne is cyclised by treatment with mercuric sulphate, a mixture of 2,2-diethyl-5-methyl-tetrahydrofuran-3-one and 2,2-diethyl-5-methyl-tetrahydrofuran-4-one is obtained. The mixture of tetrahydrofuranones obtained by the cyclisation of compounds of Formula III may be reduced as hereinbefore described to give mixtures of the corresponding furanols of Formula I, or the isomeric furanones may be separated, for example by fractional distillation, and then reduced to give the corresponding single furanol of Formula I.

The compounds of Formula III may be prepared by the reaction of Grignard compounds of the formula:

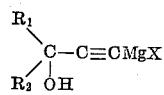

IV (wherein $R_1$ and $R_2$ are as hereinbefore defined, Mg represents the magnesium atom and X represents a halogen, preferably bromine or chlorine, atom) with acetaldehyde under conditions normally used when reacting a Grignard compound with an aldehyde to produce a secondary alcohol.

The compounds of Formula IV may be prepared by the reaction of compounds of the formula:

V wherein $R_1$ and $R_2$ are as hereinbefore defined, with acetylene, the reaction being effected in, for example, liquid ammonia in the presence of sodamide or an inert organic medium, such as an ether, e.g. tetrahydrofuran, in the presence of a strong base such as potassium hydroxide, to give compounds of the formula:

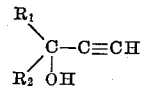

VI which are then treated with alkylmagnesium halides, preferably an ethylmagnesium halide, to give the required Grignard compounds of Formula IV.

The compounds of Formula III may also be prepared by the reaction of compounds of the formula:

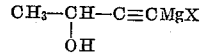

VII wherein Mg and X are as hereinbefore defined, with compounds of Formula V under conditions normally used when reacting a Grignard compound with a ketone to produce a tertiary alcohol.

The compounds of Formula VII may be prepared by the reaction of acetaldehyde with acetylene in, for example, liquid ammonia in the presence of sodamide, to give the compound of formula:

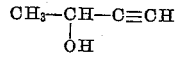

VIII which is then treated with an alkylmagnesium halide, preferably an ethylmagnesium halide, to give the required Grignard compound of Formula VII.

The compounds of Formula III may also be prepared by the reaction of the compound of Formula VIII with compounds of Formula V in an inert organic medium such as an ether, e.g. diethyl ether, in the presence of a strong base such as potassium hydroxide.

According to a further feature of the present invention, compounds of general Formula I wherein $R_3$ represents a hydrogen atom and $R_4$ represents a hydroxy group are prepared by the reduction, by methods known per se for the reduction of unsaturated ketones to secondary alcohols, of the ethylenic and ketone groups of a 2,3-dihydrofuran-3-one of the formula:

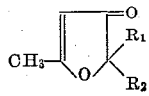   IX (wherein $R_1$ and $R_2$ are as hereinbefore defined) to the group

and

respectively, for example by catalytic hydrogenation. Hydrogenation may be carried out in an inert organic medium such as a lower alkanol, e.g. ethanol, in the presence of Raney nickel catalyst at elevated temperature and pressure.

The compounds of Formula IX may be prepared by the treatment of compounds of the general formula:

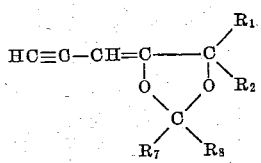   X (wherein $R_1$ and $R_2$ are as hereinbefore defined, and $R_7$ and $R_8$ are the same or different and represent hydrogen atoms or alkyl groups containing up to 4 carbon atoms) with a strong acid, for example hydrochloric or sulphuric acid, in the presence of an aqueous lower alkanol such as methanol or ethanol.

The compounds of general Formula X may be prepared by the reaction of compounds of the formula:

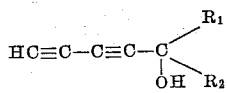   XI wherein $R_1$ and $R_2$ are as hereinbefore defined, with a compound of the general formula:

   XII (wherein $R_7$ and $R_8$ are as hereinbefore defined) in the presence of an alkali metal carbonate, e.g. potassium carbonate, in an inert organic medium such as a lower alkanol, e.g. methanol.

The compounds of Formula XI may be prepared by reaction of the monosodio derivative of diacetylene (prepared in situ from 1,4-dichloro-but-2-yne and sodamide) in liquid ammonia with a compound of Formula V.

According to another feature of the present invention, the compounds of general Formula I, wherein one of $R_3$ and $R_4$ represents a hydrogen atom and the other represents a carbamoyloxy or N-monomethylcarbamoyloxy group, are prepared from the corresponding alcohols of general Formula I by methods known per se for the conversion of an alcohol to a carbamate or N-monomethylcarbamate, for example, (a) Reacting the alcohol with phosgene to produce the corresponding chlorocarbonate and reacting the chlorocarbonate obtained with ammonia or monomethylamine;

(b) Reacting the alcohol with an alkali metal cyanate, e.g. potassium cyanate;

(c) Reacting the alcohol with phenylchloroformate to produce the corresponding phenylcarbonate and reacting the phenylcarbonate obtained with ammonia or monomethylamine;

(d) Heating the alcohol with urea;

(e) Reacting the alcohol with carbamyl chloride or N-methylcarbamyl chloride;

(f) Heating the alcohol with an alkyl carbamate such as ethyl carbamate in the presence of an ester exchange catalyst, such as aluminium isopropoxide.

Reaction of the alcohol with phosgene may be effected in an inert organic medium such as an aromatic hydrocarbon, e.g. toluene or an ether, e.g. tetrahydrofuran, in the absence or presence of an acid-binding agent such as pyridine. Reaction of the chlorocarbonate with ammonia or monomethylamine may be effected in an inert organic or aqueous organic medium, e.g. tetrahydrofuran or aqueous tetrahydrofuran, or water, in the presence of an excess of ammonia or the amine which serves as acid-binding agent. Reaction of the alcohol with phenylchloroformate may be effected in an inert organic medium in the presence of an acid-binding agent such as pyridine. Conversion of the phenylcarbonate to the corresponding carbamoyloxy or N-monomethylcarbamoyloxy compound is preferably effected by treatment with anhydrous liquid ammonia or monomethylamine. Reaction of the alcohol with carbamyl chloride or N-methylcarbamyl chloride may be effected in an inert organic medium such as an ether, e.g. diethyl ether.

The compounds of general Formula I can exist in stereoisomeric, including optically isomeric, forms. The present invention includes all such forms and mixtures and racemates thereof.

By the term "methods known per se" as used in this specification and accompanying claims is meant methods heretofore used or described in the chemical literature. The qualification "lower" as applied herein to alkanols or alkyl groups means that the alkanol or alkyl group contains at most six carbon atoms.

FIGURES I, II, III and IV of the accompanying drawings show the infra-red spectra of four tetrahydrofuranol derivatives in accordance with the present invention, viz. 2,2-diethyl-5-methyl-tetrahydrofuran-4-ol, 2,2 - diethyl - 5-methyl-tetrahydrofuran-3-ol, 3-carbamoyloxy-2,2-diethyl-5-methyl-tetrahydrofuran, and 4-carbamoyloxy-2,2 - diethyl-5-methyl-tetrahydrofuran respectively.

The following examples illustrate the preparation of the compounds of the present invention.

*Example I*

A solution of a mixture of 2,2-diethyl-5-methyl-tetrahydrofuran-3-one and 2,2-diethyl - 5 - methyl - tetrahydrofuran-4-one (133 g.) in ethanol (500 ml.) is hydrogenated for seven hours at 460 p.s.i./100° C. in the presence of Raney nickel catalyst (13 g.). After filtration, concentration and distillation under reduced pressure, a mixture of 2,2-diethyl-5-methyl-tetrahydrofuran-3-ol and 2,2-diethyl-5-methyl-tetrahydrofuran-4-ol (76 g.) is obtained in the form of a colourless oil, B.P. 103° C./8 mm. Hg.

The mixture of 2,2-diethyl-5-methyl-tetrahydrofuran-3-one and 2,2-diethyl-5-methyl-tetrahydrofuran-4-one used as starting material in the above preparation may be obtained as follows:

(a) A mixture of 2,5-dihydroxy-5-ethyl-hept-3-yne (195 g.), mercuric sulphate (41.8 g.) and water (1500 ml.) is heated on a steam bath at about 90° C. for three hours and the reaction mixture then cooled to 20° C., saturated with sodium chloride and extracted with diethyl ether (6×250 ml.). The combined ethereal extracts are dried over sodium sulphate, concentrated under reduced pressure (approx. 30 mm. Hg) on a steam bath and the residual oil distilled under reduced pressure to give a mixture of 2,2-diethyl-5-methyl-tetrahydrofuran - 3 - one and 2,2-diethyl-5-methyl-tetrahydrofuran-4-one (133 g.) in the form of a colourless oil, B.P. 77–81° C./15 mm. Hg;

(b) 2,5-dihydroxy-5-ethyl-hept-3-yne (10 g.) is added at 45–55° C. to a catalyst prepared by the addition of methanol (10 ml.) to a mixture of red mercuric oxide (0.5 g.), trichloroacetic acid (0.5 g.), methanol (0.5 ml.) and a 1:1 w./w. mixture of boron trifluoride and diethyl ether (0.5 ml.) and the suspension obtained heated at 45–55° C. for 3 hours. Potassium carbonate (1.5 g.) is added and the liquid phase decanted. The residue is extracted with diethyl ether (4×50 ml.) and the combined liquid phase and ethereal extracts dried over magnesium sulphate and concentrated on a water bath at 60° C./20 mm. Hg. The residual oil is distilled to give a mixture of 2,2-diethyl-5-methyl-tetrahydrofuran-3-one and 2,2-diethyl-5-methyl-tetrahydrofuran-4-one (4.3 g.) in the form of a colourless oil, B.P. 79–84° C./15 mm. Hg.

2,5-dihydroxy-5-ethyl-hept-3-yne may be obtained as follows:

(a) A solution of 3-ethyl-3-hydroxy-pent-1-yne (25 g.) in diethyl ether (50 ml.) is added to a solution of ethyl-magnesium bromide prepared from ethyl bromide (45 g.), magnesium turnings (9.9 g.) and diethyl ether (200 ml.) at such a rate that, with cooling in an ice bath, a gentle reflux is maintained. When the addition is complete, the reaction mixture is heated under reflux for half an hour. The reaction mixture is then cooled to about 10° C. and a solution of acetaldehyde (13.8 g.) in diethyl ether (50 ml.) added, the temperature being kept at about 10° C. When the vigorous reaction has subsided, the reaction mixture is heated under reflux for a further one and a half hours and then cooled in an ice bath. 2 N sulphuric acid (100 ml.) is added and the reaction mixture extracted with diethyl ether (3×100 ml.). The combined ethereal extracts are dried over sodium sulphate, concentrated under reduced pressure (approx. 30 mm. Hg) on a steam bath and the residue distilled under reduced pressure to give 2,5-dihydroxy-5-ethyl-hept-3-yne in the form of a colourless oil (15 g.), B.P. 85° C./0.2 mm. Hg.

(b) A mixture of diethyl ketone (10.75 g.) and 2-hydroxy-but-3-yne (8.75 g.) is added at −5° to 0° C. to a suspension of powdered potassium hydroxide (28.0 g.) in diethyl ether (25 ml.). When all exothermic reaction ceases the reaction is allowed to reach laboratory temperature. After one hour the reaction mixture solidifies and is allowed to stand overnight. The solid is dissolved in cold water (100 ml.) and the solution neutralised with solid carbon dioxide and extracted with diethyl ether (5×50 ml.). The combined ethereal extracts are dried over magnesium sulphate, concentrated under reduced pressure on a steam bath and the residue distilled under reduced pressure to give 2,5-dihydroxy-5-ethyl-hept-3-yne (7.0 g.) in the form of a colourless oil, B.P. 78–80° C./0.04 mm. Hg.

3-ethyl-3-hydroxy-pent-1-yne may be prepared as follows:

(a) Freshly crushed ferric nitrate (1 g.) is added to liquid ammonia (1000 ml.) at −35° C. and sodium (23 g.) added in portions (about 2 g. each) to the stirred suspension obtained at −35° C., each successive portion of sodium being allowed to dissolve before the next is added. The suspension of sodamide in liquid ammonia thus obtained is treated with gaseous acetylene for three hours at −35° C., a solution of diethyl ketone (86 g.) in diethyl ether (150 ml.) added at −35° C., and the mixture stirred at −35° C. for a further one and a half hours. Ammonium chloride (60 g.) is added portion-wise at −35° C. and the reaction mixture allowed to evaporate to dryness at laboratory temperature. The residue is treated with water (100 ml.) and extracted with diethyl ether (5×100 ml.). The combined ethereal extracts are dried over magnesium sulphate, concentrated at atmospheric pressure on a water bath and fractionally distilled to give 3-ethyl-3-hydroxy-pent-1-yne (96 g.) in the form of a colourless oil, B.P. 90° C./110 mm. Hg.

(b) Acetylene at a flow rate of 2.5 litres per minute is passed for three hours into a stirred suspension of powdered potassium hydroxide (2.1 kg.) in tetrahydrofuran (6 litres), cooled in an ice/salt bath. The reaction temperature falls to −15° C. The passage of acetylene is continued while diethyl ketone (1.33 kg.) is added over two hours at −10 to 0° C. The reaction mixture is then stirred for a further half an hour and poured into a mixture of ice and water (9 kg.). The tetrahydrofuran layer is separated and the aqueous phase extracted with tetrahydrofuran (5×1 litre). The combined tetrahydrofuran solutions are dried over magnesium sulphate (1 kg.), concentrated at atmospheric pressure and the residue fractionally distilled to give 3-ethyl-3-hydroxy-pent-1-yne (1.5 kg.) in the form of a colourless oil, B.P. 82–84° C./93–98 mm.Hg.

2-hydroxy-but-3-yne used in the above procedure may be obtained from acetylene and acetaldehyde by the procedures described for the preparation of 3-ethyl-3-hydroxy-pent-1-yne from acetylene and diethyl ketone.

*Example II*

A mixture of 2,2-diethyl-5-methyl-tetrahydrofuran-3-one and 2,2-diethyl-5-methyl-tetrahydrofuran-4-one (prepared as described in Example I; 342 g.) is distilled through a column (height 145 cm., diameter 3 cm.) packed with Monel knitmesh. The reflux ratio is 32:1 throughout and the barometric pressure is 757 mm. Hg. The following fractions are obtained:

*Fraction I*, shown by vapour phase chromatography to consist of 98% of a single isomer (77.9 g.), B.P. 184–186° C., identified as 2,2-diethyl-5-methyl-tetrahydrofuran-4-one, is collected over 68 minutes at a boiler temperature of 119.5–200° C.;

*Fraction II*, shown by vapour phase chromatography to consist of an approximately 1:1 mixture of 2,2-diethyl-5-methyl-tetrahydrofuran-3-one, and 2,2-diethyl-5-methyl-tetrahydrofuran-4-one (101.4 g.) B.P. 186–192.5° C., is collected over 95 minutes at a boiler temperature of 203–208° C.

*Fraction III*, shown by vapour phase chromatography to consist of 100% of a single isomer (138.4 g.), B.P. 192° C., identified as 2,2-diethyl-5-methyl-tetrahydrofuran-3-one, is left as a residue in the boiler.

The three fractions are separately dissolved in ethanol and hydrogenated in the presence of Raney nickel catalyst as described in Example I to give colourless oils which are, respectively, 2,2 - diethyl-5-methyl-tetrahydrofuran - 4-ol, B.P. 88–90° C./10 mm. Hg, an approximately 1:1 mixture of 2,2-diethyl-5-methyl-tetrahydrofuran-3-ol and 2,2-diethyl-5-methyl-tetrahydrofuran-4-ol, B.P. 103° C./8 mm. Hg, and 2,2-diethyl-5-methyl - tetrahydrofuran-3-ol, B.P. 89–91° C./10 mm. Hg.

The infra-red spectra of 2,2-diethyl-5-methyl-tetrahydrofuran-4-ol and 2,2-diethyl-5-methyl-tetrahydrofuran-3-ol are given in FIGURES I and II respectively of the accompanying drawings.

*Example III*

A solution of a mixture of 2,2-diethyl-5-methyl-tetrahydrofuran-3-one and 2,2 - diethyl-5-methyl-tetrahydrofuran-4-one (prepared as described in Example I; 4.1 g.) in anhydrous diethyl ether (20 ml.) is added to a stirred suspension of lithium aluminium hydride (0.5 g.) in anhydrous diethyl ether (100 ml.), under an atmosphere of dry nitrogen, at such a rate as a maintain a gentle reflux. When the addition is complete, the reaction mixture is heated under reflux for two hours. The reaction mixture is then cooled in an ice bath and moist diethyl ether (20 ml.) cautiously added. Water (0.5 ml.) is then added to the reaction mixture followed by 10% aqueous sodium hydroxide solution (0.5 ml.) and finally water (0.5 ml.). The resulting suspension is filtered and the ethereal solution dried over magnesium sulphate, filtered and concentrated under reduced pressure (approx. 30 mm. Hg). The residue is distilled under reduced pressure to give a mixture of 2,2-diethyl-5-methyl-tetrahydrofuran-3-ol and 2,2-diethyl-5-methyl-tetrahydrofuran-4-ol (3.3 g.) in the form of a colourless oil, B.P. 98–100° C./10 mm. Hg.

*Example IV*

A solution of potassium borohydride (1.7 g.) in 2 N aqueous sodium hydroxide solution (2 ml.) and water (18 ml.) is added to a solution of a mixture of 2,2-diethyl-5-methyl-tetrahydrofuran-3-one and 2,2-diethyl-5-methyl-tetrahydrofuran-4-one (prepared as described in Example I; 10 g.) in methanol (100 ml.) at such a rate as to maintain the temperature within the range 18–25° C. When the addition is complete, the reaction mixture is stirred at laboratory temperature for half an hour. The methanol is then removed by distillation and the residue treated with water (100 ml.). The mixture obtained is extracted with diethyl ether (5×50 ml.) and the combined ethereal extracts dried over magnesium sulphate, filtered and concentrated under reduced pressure (approx. 90 mm. Hg). The residue is distilled under reduced pressure to give a mixture of 2,2-diethyl-5-methyl-tetrahydrofuran-3-ol and 2,2-diethyl-5-methyl-tetrahydrofuran-4-ol (7.25 g.) in the form of a colourless oil, B.P. 98–103° C./20 mm. Hg.

*Example V*

Clean sodium (8.85 g.) is added portion-wise to a solution of a mixture of 2,2-diethyl-5-methyl-tetrahydrofuran-3-one and 2,2-diethyl-5-methyl-tetrahydrofuran-4-one (obtained as described in Example I; 10 g.) in ethanol (45 ml.) at such a rate as to keep the solution at a vigorous reflux. After the reaction has subsided, excess sodium is removed by adding ethanol (50 ml.) and heating the reaction mixture on a steam bath. The reaction mixture is then carefully neutralised with 2 N hydrochloric acid, the temperature of the mixture being maintained below 20° C. The ethanol is then removed by distillation at atmospheric pressure and the residual liquid extracted with diethyl ether (5×50 ml.). The combined ethereal extracts are dried over potassium carbonate and concentrated under reduced pressure (approx. 90 mm. Hg) on a water bath. The residual oil is distilled under reduced pressure to give a mixture of 2,2-diethyl-5-methyl-tetrahydrofuran-3-ol and 2,2-diethyl-5-methyl-tetrahydrofuran-4-ol (9.28 g.) in the form of a colourless oil, B.P. 98–115° C./10 mm. Hg.

*Example VI*

A solution of 2,2-diethyl-5-methyl-2,3-dihydrofuran-3-one (3.6 g.) in ethanol (25 ml.) is hydrogenated for seven and a half hours at 400 p.s.i./110° C. in the presence of Raney nickel catalyst (0.7 g.). After cooling, the reaction mixture is filtered and concentrated on a steam bath at 60° C./20 mm. Hg. The residue obtained is distilled to give 2,2-diethyl-5-methyl-tetrahydrofuran-3-ol (1.5 g.) in the form of a colourless oil, B.P. 99–101° C./15 mm. Hg.

2,2-diethyl-5-methyl-2,3-dihydrofuran-3-one used as starting material in the above preparation may be obtained as follows:

1,4-dichlorobutyne (92 g.) is added over thirty minutes to a stirred suspension of sodamide in liquid ammonia obtained from sodium (51 g.) and liquid ammonia (1.5 litres), the temperature being maintained below −35° C. by means of a solid carbon dioxide/acetone bath. When the addition is complete, the reaction mitxure is stirred for five minutes and diethyl ketone (49 g.) in anhydrous diethyl ether (100 ml.) added over fifteen minutes. The reaction mixture is then stirred for two and a half hours at −40° C. Ammonium chloride (150 g.) is then slowly added and the mixture left for sixteen hours to allow the ammonia to evaporate. The solid residue is treated with moist diethyl ether (250 ml.) under an atmosphere of nitrogen, dissolved in water (200 ml.). The combined ethereal extracts are dried over magnesium sulphate, filtered, concentrated on a water bath at 60° C./20 mm. Hg and distilled under an atmosphere of nitrogen to give 5-ethyl-hept-1,3-diyne-5-ol (56.45 g.) in the form of a red oil, B.P. 58–62° C./0.05 mm. Hg.

5-ethyl-hept-1,3-diyne-5-ol (49.4 g.) is added to a mixture of paraformaldehyde (49.4 g.), anhydrous potassium carbonate (22.4 g.) and methanol (500 ml.) and the reaction mixture heated under reflux for eighteen hours, cooled, neutralised to pH 7 with 2 N acetic acid and concentrated on a water bath at 60° C./20 mm. Hg. The residue is treated with benzene (200 ml.) and water (200 ml.) and the separated benzene layer dried over magnesium sulphate, filtered, concentrated on a water bath at 50° C./50 mm. Hg and distilled to give 4-ethynyl-methylene-3,3-diethyl-dioxalan (12.85 g.) in the form of a colourless oil, B.P. 110–120° C./20 mm. Hg.

4-ethynyl-methylene-3,3-diethyl-dioxalan (12.85 g.) is added slowly to a stirred mixture of methanol (35 ml.), water (7.3 ml.) and concentrated sulphuric acid (0.59 ml.). After the reaction has subsided, the reaction mixture is heated under reflux for one hour, when its colour changes from orange to green. The mixture is then concentrated on a steam bath at atmospheric pressure, the fraction which distils below 62° C. being removed. The residual solution is then neutralised with 2 N aqueous sodium hydroxide solution and concentrated on a steam bath at atmospheric pressure to remove the methanol. The residual oil is extracted with diethyl ether (3×100 ml.) and the combined ethereal extracts washed with saturated sodium chloride solution (2×50 ml.). The ethereal layer is then separated, dried over magnesium sulphate, filtered and concentrated on a water bath at 50° C./50 mm. Hg to remove the diethyl ether. The residual oil is distilled to give 2,2-diethyl-5-methyl-dihydrofuran-3-one (3.6 g.) in the form of a colourless oil, B.P. 94–99° C./15 mm. Hg.

*Example VII*

Proceeding as described in Example I, 3-methyl-3-hydroxy-hex-1-yne, a colourless oil, B.P. 132–138° C./10 mm. Hg, is converted by treatment with ethylmagnesium bromide and acetaldehyde to 2,5-dihydroxy-5-methyl-oct-3-yne, a colourless oil, B.P. 132–138° C./10 mm. Hg. which is converted by treatment with mercuric sulphate to a mixture of 2-methyl-2-propyl-5-methyl-tetrahydrofuran-3-one and 2-methyl-2-propyl-5-methyl-tetrahydrofuran-4-one, a colourless oil, B.P. 70–73° C./10 mm. Hg. The latter product is then hydrogenated in the presence of Raney nickel catalyst to give a mixture of 2-methyl-2-propyl-5-methyl-tetrahydrofuran-3-ol and 2-methyl-2-propyl-5-methyl-tetrahydrofuran-4-ol, a colourless oil, B.P. 102–103° C./10 mm. Hg.

3-methyl-3-hydroxy-hex-1-yne, used as starting material is obtained by the procedure described in Example I for the preparation of 3-ethyl-3-hydroxy-pent-1-yne by the reaction of acetylene with methyl propyl ketone.

*Example VIII*

Proceeding as described in Example I for the preparation of 2,5-dihydroxy-5-ethyl-hept-3-yne from 3-ethyl-3-hydroxy-pent-1-yne and acetaldehyde or from 2-hydroxy-but-3-yne and diethyl ketone, 2,5-dihydroxy-5-ethyl-oct-3-yne is prepared from 2-hydroxy-but-3-yne and ethyl propyl ketone. 2,5-dihydroxy-5-ethyl-oct-3-yne, a colourless oil, B.P. 99–103° C./0.05 mm. Hg, is then treated with mercuric sulphate, as described in Example I for the conversion of 2,5-dihydroxy-5-ethyl-hept-3-yne to 2,2-diethyl-5-methyl-tetrahydrofuran-3-one and 2,2-diethyl-5-methyl-tetrahydrofuran-4-one, to give a mixture of 2-ethyl-2-propyl-5-methyl-tetrahydrofuran-4-one and 2-ethyl-2-propyl-5-methyl-tetrahydrofuran-3-one, a colourless oil, B.P. 98–100° C./20 mm. Hg, which is then hydrogenated in the presence of Raney nickel catalyst as described in Example I to give a mixture of 2-ethyl-2-propyl-5-methyl-tetrahydrofuran-3-ol and 2-ethyl-2-propyl-5-methyl-tetrahydrofuran-4-ol, a colourless oil, B.P. 115–119° C./22 mm. Hg.

Example IX

A mixture of 2,2-diethyl-5-methyl-tetrahydrofuran-3-ol and 2,2-diethyl-5-methyl-tetrahydrofuran-4-ol (prepared as described in Example I; 5 g.) in tetrahydrofuran (50 ml.) is added dropwise at −8° C. to +4° C. to a stirred solution of phosgene (5.3 g.) in tetrahydrofuran (10 ml.). The resulting solution, containing a mixture of 2,2-diethyl-5-methyl-tetrahydrofuran-3-chlorocarbonate and 2,2-diethyl-5-methyl-tetrahydrofuran-4-chlorocarbonate, is allowed to warm to laboratory temperature over-night and then added dropwise to stirred concentrated aqueous ammonium hydroxide solution (d.= 0.88; 22 ml.), the temperature being maintained at about 10° C. The suspension is stirred for a further thirty minutes and then treated with water (10 ml.) to dissolve the precipitated solid. The solution is extracted with diethyl ether (3×50 ml.) and the extracts dried over magnesium sulphate and concentrated at 50° C./20 mm. Hg to give an oil which crystallises on standing. Recrystallisation from a mixture of benzene and light petroleum (B.P. 60–80° C.) gives a mixture of 3-carbamoyloxy-2,2-diethyl-5-methyl-tetrahydrofuran and 4-carbamoyloxy-2,2-diethyl-5-methyl-tetrahydrofuran (2.5 g.) as a white solid, M.P. 56–57° C.

The chlorocarbonate intermediates used in the above preparation may also be obtained as follows:

A solution of a mixture of 2,2-diethyl-5-methyl-tetrahydrofuran-3-ol and 2,2-diethyl- 5 - methyl - tetrahydrofuran-4-ol (40 g.) in pyridine (20.4 ml.) is added dropwise at 20–30° C. to a stirred solution of phosgene (57.5 g.) in toluene (125 ml.). The resulting suspension is stirred at laboratory temperature for three hours and then filtered to remove precipitated pyridine hydrochloride. The excess phosgene is removed from the solution under vacuum and the solution fractionally distilled to give a mixture of 2,2-diethyl-5-methyl-tetrahydrofuran-3-chlorocarbonate and 2,2-diethyl-5-methyl-tetrahydrofuran-4-chlorocarbonate (39 g.) in the form of a colourless oil, B.P. 101–102° C./10 mm. Hg. This mixture may be dissolved in tetrahydrofuran and reacted with concentrated aqueous ammonium hydroxide solution as described above to give an identical product.

Example X

Proceeding as in Example IX but commencing, separately, with 2,2-diethyl-5-methyl-tetrahydrofuran-3-ol and 2,2-diethyl-5-methyl-tetrahydrofuran-4-ol (prepared as described in Example II), there are obtained, respectively, 3 - carbamoyloxy - 2,2 - diethyl-5-methyl-tetrahydrofuran, a white solid, M.P. 86–87° C., and 4-carbamoyloxy-2,2-diethyl-5-methyl-tetrahydrofuran, a white solid, M.P. 84–85° C.

The infra-red spectra of the two products are given in FIGURES III and IV respectively of the accompanying drawings.

Example XI

Proceeding as in Example IX but replacing the concentrated aqueous ammonium hydroxide solution by a solution of monomethylamine (33% w./v.) in ethanol, a mixture of 3-N-methylcarbamoyloxy-2,2-diethyl-5-methyl-tetrahydrofuran and 4-N-methylcarbamoyloxy-2,2-diethyl-5-methyl-tetrahydrofuran is obtained in the form of a colourless oil, B.P. 104–109° C./0.04 mm. Hg.

Example XII

Trifluoracetic acid (14.45 g.) is added dropwise to a mixture of 2,2-diethyl-5-methyl-tetrahydrofuran-3-ol and 2,2-diethyl-5-methyl-tetrahydrofuran-4-ol (prepared as described in Example I; 10 g.), potassium cyanate (10.25 g.) and benzene (75 ml.) with slow stirring, the temperature being kept between 25° and 35° C. The reaction mixture is then stirred gently for fifteen hours, water (25 ml.) added and the mixture extracted with benzene (4×50 ml.). The combined benzene extracts are dried over magnesium sulphate and concentrated on a water bath at 60° C./90 mm. Hg. The residual oil is distilled under reduced pressure to give a mixture of 3-carbamoyloxy - 2,2 - diethyl - 5 - methyl - tetrahydrofuran and 4-carbamoyloxy - 2,2 - diethyl - 5-methyl-tetrahydrofuran (3.14 g.) in the form of a colourless oil, B.P. 115–117° C./0.1 mm. Hg, which solidifies on standing to a white solid, M.P. 52–53° C.

Example XIII

A mixture of 2,2-diethyl-5-methyl-tetrahydrofuran-3-ol and 2,2-diethyl-5-methyl-tetrahydrofuran-4-ol (prepared as described in Example I; 10.4 g.) is added to a mixture of ethyl carbamate (12.6 g.) and aluminium isopropoxide (1.0 g.) and the mixture heated at 210–220° C. until no more ethanol distils off. The residue is then fractionally distilled to give a mixture of 3-carbamoyloxy-2,2-diethyl-5-methyl-tetrahydrofuran and 4-carbamoyloxy-2,2-diethyl-5-methyl-tetrahydrofuran (3.0 g.) in the form of a colourless oil, B.P. 98–108° C./0.025 mm. Hg, which is recrystallised from 60–80° C. petroleum ether to give a white solid, M.P. 55–57° C.

Example XIV

Proceeding as described in Example IX but commencing with a mixture of 2-ethyl-2-propyl-5-methyl-tetrahydrofuran-3-ol and 2-ethyl-2-propyl-5-methyl-tetrahydrofuran-4-ol (prepared as described in Example VIII), a mixture of 3 - carbamoyloxy - 2 - ethyl-2-propyl-5-methyl-tetrahydrofuran and 4-carbamoyloxy-2-ethyl-2-propyl-5-methyl-tetrahydrofuran is obtained as a white solid, M.P. 72–74° C.

The present invention further includes within its scope pharmaceutical compositions which comprise, as active ingredient, one or more compounds of general Formula I, in association with a pharmaceutical carrier or coating. The invention includes especially compositions suitable for oral and parenteral administration.

Solid compositions for oral administration include compressed tablets (including enteric coated tablets), pills, dispersible powders, and granules. In such solid compositions one or more of the active compounds is, or are, admixed with at least one inert diluent such as calcium carbonate, potato starch, alginic acid, sucrose or lactose. The compositions may also comprise, as is normal practice, additional substances other than inert diluents, e.g. lubricating agents such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and preserving, perfuming, sweetening and flavouring agents. The compositions according to the invention for oral administration also include capsules of absorbable material such as gelatin containing one or more of the active substances with or without the addition of diluents or excipients.

Preparations according to the invention for parenteral administration include sterile aqueous or non-aqueous solutions, suspensions or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile compositions, which can be dissolved in sterile water or some other sterile injectable medium immediately before use.

The percentage of active ingredient in the compositions of the invention may be varied, it being necessary that it should constitute a proportion such that a suitable dosage for the pharmacodynamic effect desired in the species of animal shall be obtained. Obviously several unit dosage forms may be administered at about the same time and the optimum dosage will vary from subject to subject. In general, the pharmaceutical compositions of the present invention should normally contain at least 10.0% by weight of active substance in the case of compositions suitable for oral administration and at least 1.0% by weight of such substance in the case of injectable preparations.

The dose to be used depends upon the species of animal and the pharmacodynamic effect sought.

The following examples illustrate pharmaceutical compositions according to the present invention.

*Example XV*

Tablets of the formula:

|  | Mg. |
|---|---|
| 3-carbamoyloxy - 2,2-diethyl - 5-methyl - tetrahydrofuran | 100 |
| Lactose | 99 |
| Starch | 50 |
| Dextrin | 50 |
| Magnesium stearate | 1.0 | are prepared by intimately mixing the tetrahydrofuran derivative, lactose, starch and dextrin and passing the mixture through a 60-mesh British Standard sieve. After addition of the magnesium stearate, the mixture is granulated to a suitable size and the granules compressed to form tablets.

*Example XVI*

An injectable solution is prepared from:

|  | G. |
|---|---|
| 3-carbamoyloxy - 2,2-diethyl - 5-methyl-tetrahydrofuran | 5 |
| Cremophor EL (an ethoxylated castor oil derivative) | 20 |
| Distilled water to 100 ml. |  | by mixing the tetrahydrofuran derivative with Cremophor EL and adding distilled water to a volume of 100 ml. The solution obtained is filtered and filled into ampoules. The ampoules are sterilised in an autoclave at 115° C.

Similar solutions can be prepared from any of the other products conforming to general Formula I described in Examples I to XIV.

We claim:

1. Tetrahydrofuranol derivatives of the formula:

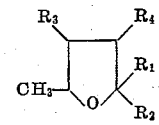

wherein $R_1$ and $R_2$ each represents an ethyl group, and one of $R_3$ and $R_4$ represents a hydrogen atom and the other represents a carbamoyloxy group.

2. 3-carbamoyloxy - 2,2-diethyl - 5-methyl-tetrahydrofuran.

3. 4-carbamoyloxy - 2,2-diethyl - 5-methyl-tetrahydrofuran.

References Cited

UNITED STATES PATENTS 3,073,848   1/1963   Wasson et al. _____ 260—347.4

OTHER REFERENCES

Noller: Chemistry of Organic Compounds, 2nd ed., 1957, pp. 198–99.

Korobitsyna et al.: Zhur. Obshchei Khim., vol. 30, 1960, pp. 2214–15.

ALEX MAZEL, *Primary Examiner.*

HENRY R. JILES, *Examiner.*

JAMES H. TURNIPSEED, *Assistant Examiner.*